RADIO MIRROR

Original Filed Sept. 20, 1947 3 Sheets-Sheet 1

INVENTORS
NOEL M. RUST
MICHAEL C. GREGORY
BY J. L. Whittaker
ATTORNEY

RADIO MIRROR

Original Filed Sept. 20, 1947

3 Sheets-Sheet 2

INVENTORS
NOEL M. RUST
MICHAEL C. GREGORY
BY J. L. Whittaker
ATTORNEY

Nov. 4, 1952 N. M. RUST ET AL 2,617,030

RADIO MIRROR

Original Filed Sept. 20, 1947 3 Sheets-Sheet 3

INVENTORS
NOEL M. RUST
MICHAEL C. GREGORY
BY J. L. Whittaker
ATTORNEY

Patented Nov. 4, 1952 2,617,030

UNITED STATES PATENT OFFICE 2,617,030

RADIO MIRROR

Nöel Meyer Rust, Chelmsford, England, and Michael Craven Gregory, Abercorn, Northern Rhodesia, assignors, by mesne assignments, to Radio Corporation of America, New York, N. Y., a corporation of Delaware Continuation of application Serial No. 775,277, September 20, 1947. This application August 14, 1951, Serial No. 241,816. In Great Britain March 21, 1946

Section 1, Public Law 690, August 8, 1946
Patent expires March 21, 1966

11 Claims. (Cl. 250—33.63)

This invention relates to radio mirrors, that is to say to mirror-like devices for radiating very high frequency radio energy into space or receiving such energy from space. Radio mirrors have numerous applications among which are included radar.

This is a continuation of United States application Serial No. 775,277, filed September 20, 1947, entitled "Radio Mirrors," now abandoned.

For brevity of description the invention will be herein described with reference to the transmission of radio energy. Since, however, a radio mirror is in essence a reversible device it will be readily appreciated by those skilled in the art that the various constructions to be described herein are utilizable, if desired, for reception as well as for transmission.

The invention is primarily, though not exclusively, concerned with the use of flat mirrors for giving, in conjunction with a primary source of radio energy, a sharply directive beam. A typical and important, though not by any means the only, case to which the invention may be applied is that in which a primary source projects a beam of radiation on to a mirror which reflects it as a sharply directive beam. In this case, for high efficiency the whole beam is required to be intercepted by the mirror and this case will now be considered for the purpose of explaining the invention.

The invention is illustrated in and further explained in connection with the accompanying drawings in which similar references are used for similar parts throughout.

Figures 1, 2:
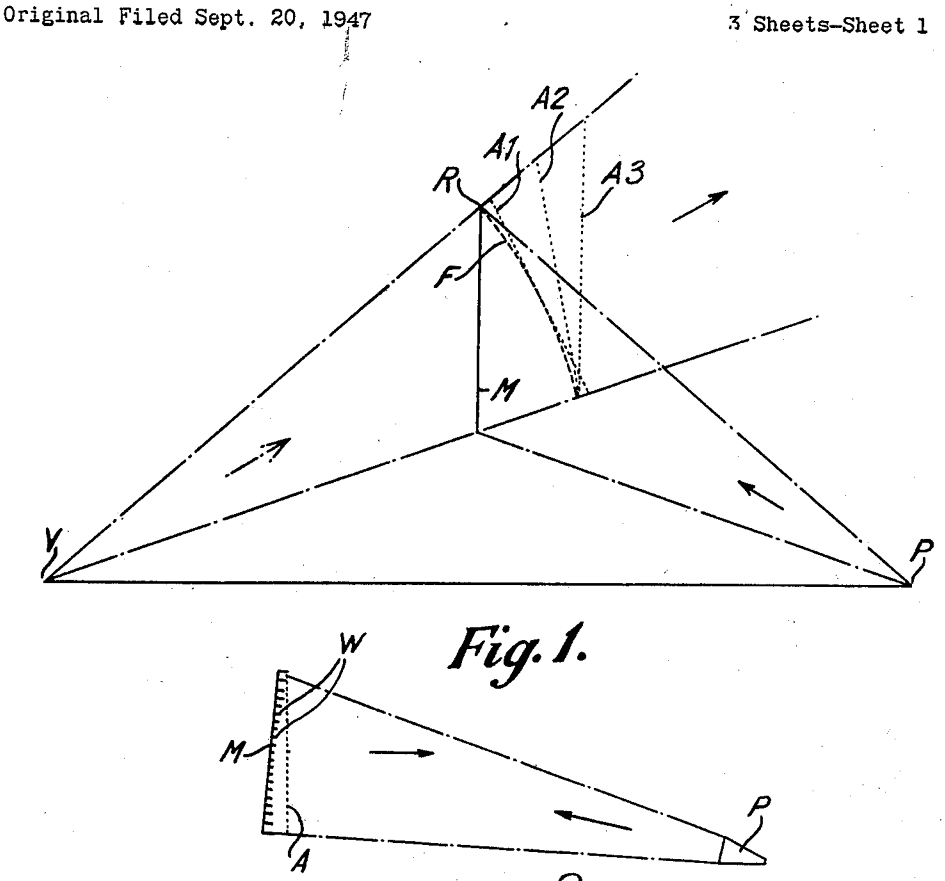
Fig. 1 is a diagram used to explain certain optical laws pertinent to an understanding of the invention.
Fig. 2 is a diagrammatic side elevation view of one embodiment of the invention having horizontal phase velocity varying plates.

Referring first to Fig. 1 which is an explanatory diagram it is well known from a consideration of ordinary optical laws, which of course apply both to light and to electromagnetic waves, that the reflected radiation from a plane mirror M due to incident light thereon from a point source P in front of the mirror may be regarded as equivalent to direct radiation from a virtual source V located behind the mirror, the actual and virtual sources being equidistant on opposite sides of the mirror plane, and the reflected rays behaving as though they originated, without reflection, from the virtual source V. Now the wave front of the equivalent beam of radiation intercepted by the mirror is spherical and the present invention when applied to this case serves in effect to flatten this spherical wave front at a particular plane relative to the actual mirror and which may be regarded as the equivalent aperture of the system.

Consider the spherical wave front at the remotest point R (the upper edge in Figure 1) of the mirror M from the virtual source V. This front which is represented in broken line at F is the segment of a sphere drawn through the said point having the virtual source as centre and bounded by the extreme rays of the beam touching the edges of the mirror. The equivalent aperture may be any plane such as A1, A2 or A3 (shown dotted) tangential to this spherical segment F and bounded by the intersection with the beam from the virtual source. That equivalent aperture A1 (the normal equivalent aperture) which is normal to the central axis of the beam from the virtual source V involves the least amount of correction (applied by this invention) to achieve and therefore it is preferred to apply this invention to achieve what may be termed a normal equivalent aperture. The invention may, however, be applied to achieve an equivalent aperture in any plane which fulfills the conditions herein outlined. In the case of the normal equivalent aperture the direction of maximum radiation will be that of the ray along the central axis. In the most usual case, that in which the invention is employed to provide an equi-phase surface over the equivalent aperture, the direction of the beam will be normal to the aperture plane. As will be seen later the invention achieves its ends by differently modifying the velocity of propagation of the radio energy along different rays from the actual source either before the mirror is reached or after reflection from the mirror or, preferably, both.

In the foregoing description the energy source has been assumed to be a point source so as to simplify explanation. In practice, of course, point sources do not exist and, moreover, in many cases there is no attempt to approximate to a point source, for example the source may approximate to a line source. Nevertheless, the foregoing general reasoning applies though its application in any particular case may be more complex geometrically. In general the practical requirement is to direct as much as possible of a radiated beam of energy from the source to the mirror and then to reflect the beam in the required direction and with the required degree of sharpness of directivity with as little obstruction as possible by the original source. The general design of source and mirror is chosen, in each case, in dependence upon requirements as to directivity but in arrangements as employed hitherto there has been the defect, more or less serious as respects attainment of desired directivity, that the different path lenghs from source to equivalent aperture introduce undesired phase change inequalities in the way pointed out above. The object of this invention is to avoid this defect and to provide mirror arrangements wherein a desired phase relationship (usually, but not necessarily, equal) is obtained across the equivalent aperture.

The invention is based on the fact that the phase of a field in a space bounded on at least two sides by conductive surfaces placed parallel to the electric field and not less than half a wave length apart progress at a velocity greater than the velocity in free space, this increase in velocity resulting from the inter-action of waves reflected from the boundary walls. This field velocity or phase velocity may be controlled by controlling the spacing of the boundary walls, the spacing being, of course, always not less than a half wave length.

The present invention is based upon the abovementioned physical phenomenon and consists in utilizing the said phenomenon to compensate for the undesired effects of different path lengths from source to equivalent aperture so as to ensure that despite such different lengths a desired phase condition—generally uniformity—is obtained over the aperture.

According to this invention a radio mirror arrangement is provided with means for differently modifying the velocity of propagation over different paths from a wave guide end, aerial or other device associated with said mirror, to the equivalent aperture of said mirror (or vice versa) so that despite the different lengths of the said paths on the phase distribution across said aperture relative to the phase at the wave guide end or other device, a desired predetermined phase distribution is obtained across said aperture.

Figures 3, 4, 5, 10:
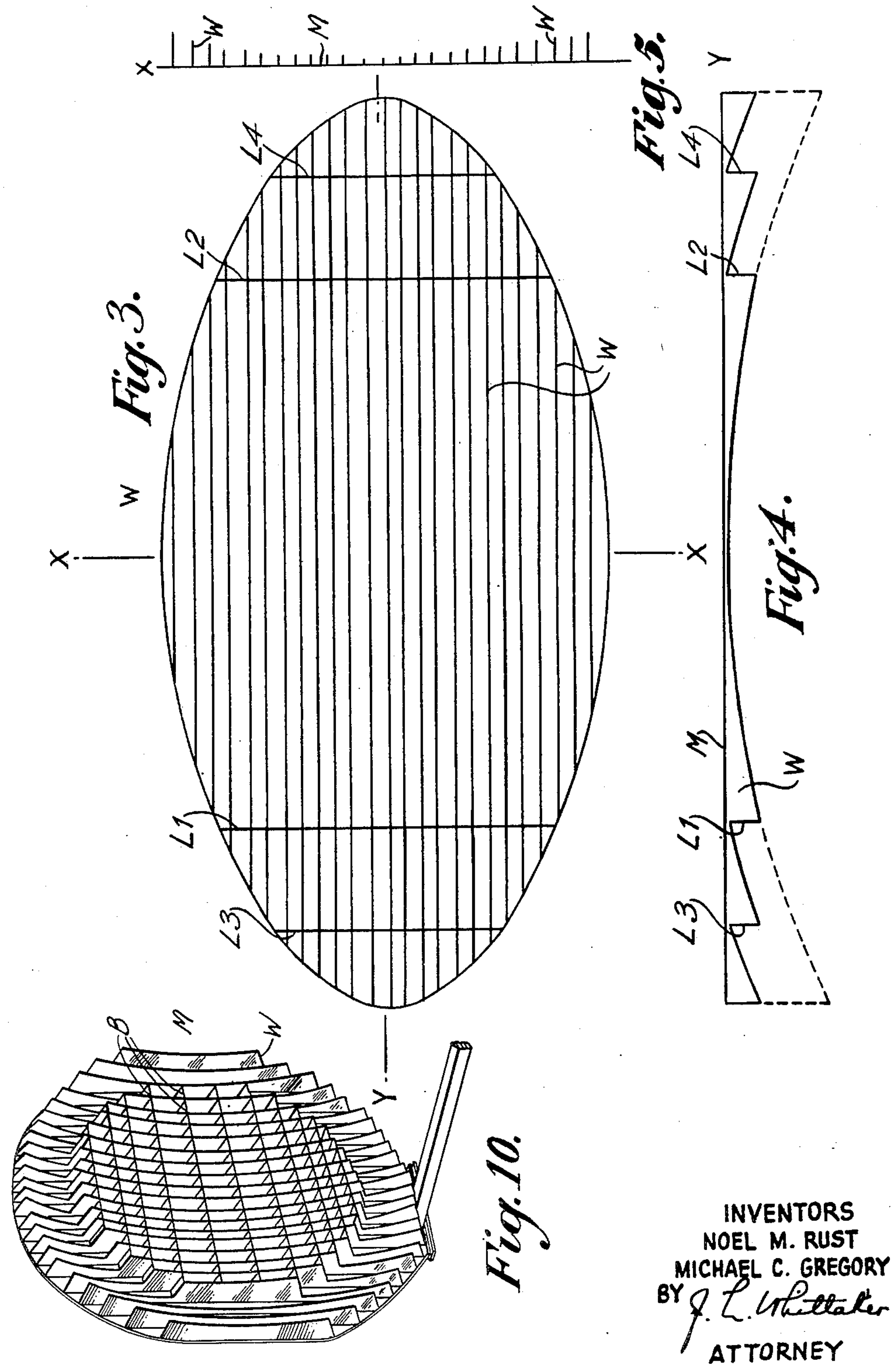
Fig. 3 is a simplified elevational view of a mirror or reflector employed in the embodiment of Fig. 2.
Fig. 4 is a diagrammatic sectional view taken along the line Y—Y of Fig. 3.
Fig. 5 is a diagrammatic sectional view along the line X—X of Fig. 3.
Fig. 10 is a perspective view of a further embodiment of the invention employing stepped vertical phase velocity varying plates.

Figure 2 is a diagrammatic side elevation of one embodiment of the invention as applied to a horizontally polarized system requiring better directivity in the horizontal plane than in the vertical plane; Figure 3 is a simplified full view of the mirror employed in the embodiment; Figure 4 is a section on the line Y—Y of Figure 3 and Figure 5 is a section on the line X—X of Figure 3.

Referring to Figures 2 to 5 the source of energy is a feed horn or wave guide flare P having a rectangular mouth which is of larger dimension vertically than horizontally. (It may be noted that if the flare were required to be used for direct radiation into space without a mirror it would, for the above-mentioned directivity requirements, be made with its larger dimension in the horizontal plane, i. e. the plane in which maximum sharpness of beam is required.) The flare projects its beam on to a flat approximately elliptical mirror M positioned and inclined to reflect the beam back over the top of the flare so as just to clear its upper (narrow) edge. In order to simplify Figure 2 the reflected beam is not shown. For this arrangement the equivalent aperture of the mirror is a flat surface A (shown dotted) in front of it and inclined to the said mirror, being nearest thereto at the top and furthest away at the bottom. The shortest ray path from flare to equivalent aperture is that from the middle of the flare mouth to a point of reflection at the middle of the mirror, all the other paths being longer. To avoid the defect of inequality of phase distribution at the aperture the mirror is provided, in accordance with this invention, with a series of partition plates W which, in effect, subdivide the space immediately in front of the mirror into a series of short wave guide sections of varying lengths. In the present case of horizontal polarization the partition plates W, or correcting plates, as they may be termed, are horizontal and parallel to one another and to the electric field from the flare, being directly attached, edge on to the mirror proper M, which may be a flat solid conductor or made of mesh or gauze or wire in any convenient well known way.

The plate edges further from the mirror are curved (see Figure 4) so that each is of minimum length (i. e. the dimension in the direction of energy propagation) at the vertical centre line of the mirror. Similarly the lengths of the separate plates are varied from top to bottom of the mirror (see (Figure 5), being of minimum length at the horizontal centre line. Assuming the spacing of the plates to be chosen equal throughout and such as to make the velocity between them twice the free space velocity (these two conditions are not necessary conditions but provide the easiest case to consider) the plates may be so arranged that their curved edges lie in a substantially spherical surface oppositely curved with respect to and thus compensatory for, an imaginary curved surface tangential to the equivalent aperture and at which reflected rays of equal length from the flare mouth terminate. Since the extent of velocity modification produced by any pair of plates is a function of their spacing, if the plates are not equally spaced or are not spaced to produce twice the free space velocity, their shapes must be modified from that just described to produce the same results. In order to economize in metal however, the construction just described may be, and preferably is, modified as shown by stepping each plate back by a wave length at points L1, L2, L3, L4 where its length (its dimension in the direction of propagation) is equal to one wave length plus the length of the centre plate at its middle, i. e., where the shortest ray path is situated. This, of course, will result in different points on the equivalent aperture having phases differing by an integral number of wavelengths, but this is equivalent to equal phase distribution. In Figure 4 the "unstepped" construction is indicated by the broken line continuation of the central portion of the plate therein shown.

It may be noted that each ray passes twice through each wave guide section provided by the plates. This, of course, involves a shorter length of plate (half) than would otherwise be necessary.

Figures 6, 7:
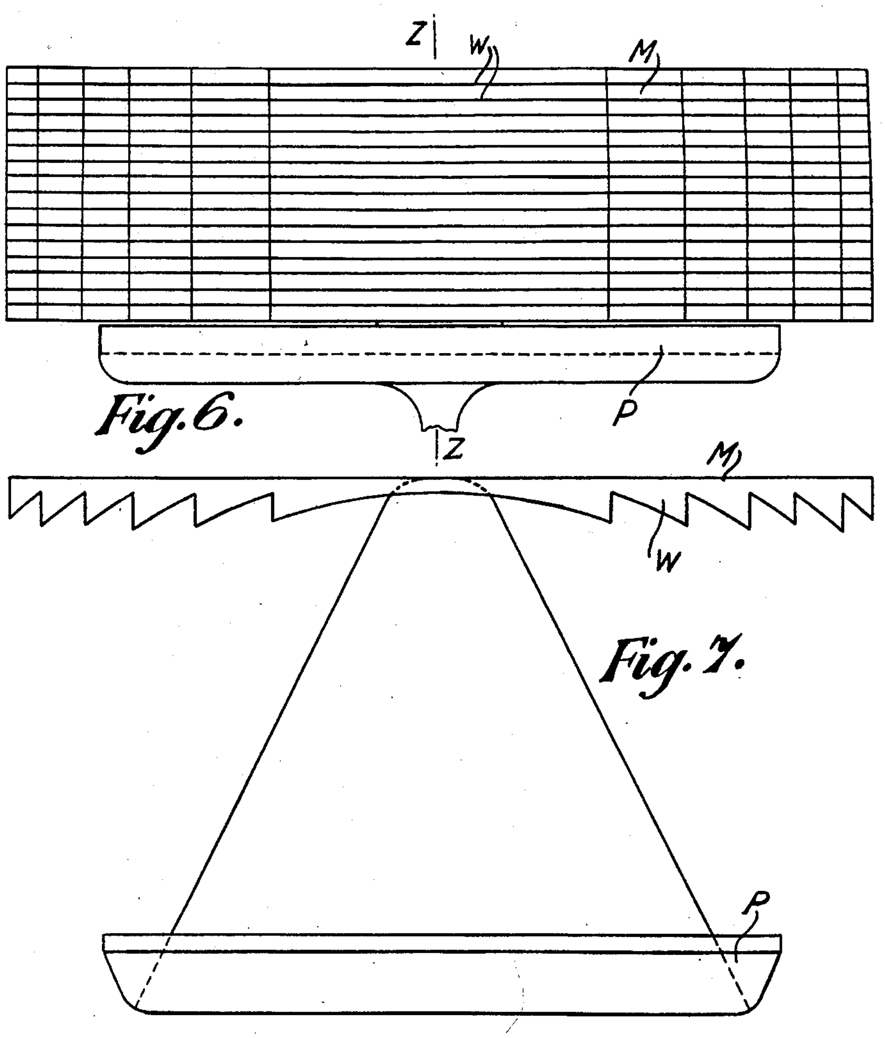
Figs. 6 and 7 are respectively diagrammatic elevational and plan views of another embodiment of the invention employing horizontal stepped phase velocity varying plates.
Figure 8:
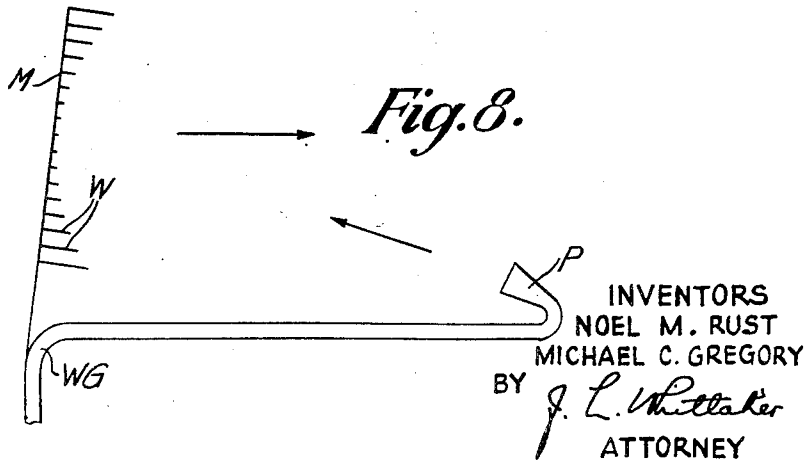
Fig. 8 is a diagrammatic sectional view along the line Z—Z of Fig. 6.

In another embodiment illustrated in diagrammatic front elevation and plan in Figures 6 and 7 respectively, and in diagrammatical central sectional elevation (on the line Z—Z of Figure 6) in Figure 8 the energy source P approximates to a line and is constituted by the wide shallow mouth of a flat, flared horn flaring out from a wave guide WG and bent over to direct energy towards a rectangular mirror M which is, as before, positioned to reflect the beam back over the upper edge of the horn. This mirror is also fitted with horizontal partition plates W shaped and arranged in accordance with the principles already described.

Figure 9:
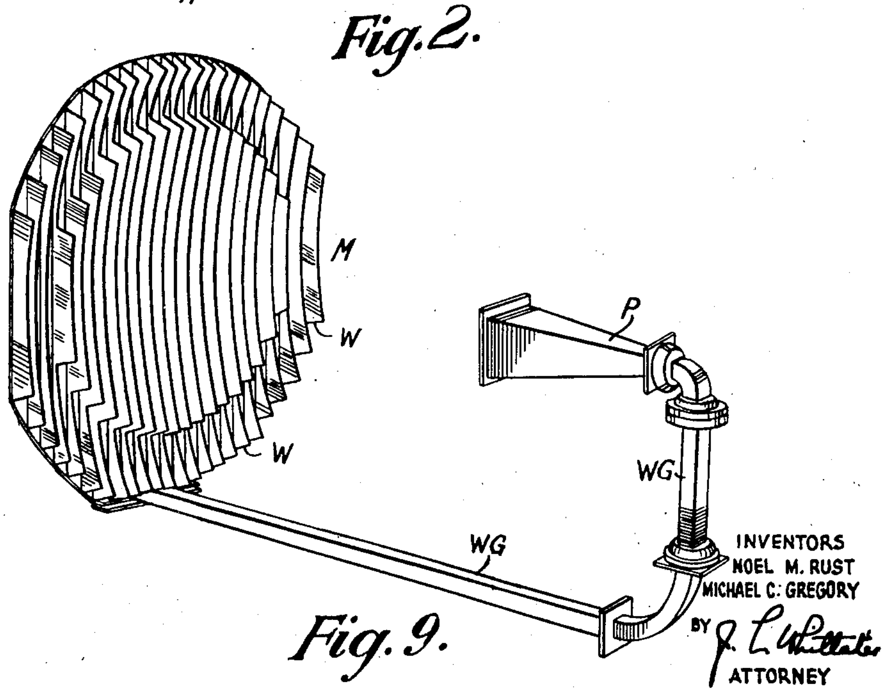
Fig. 9 is a perspective view of still another embodiment of the invention employing vertical phase velocity varying plates.

Figure 9, which will be found self-explanatory in view of the description already given, shows an embodiment for a vertically polarized system differing from the preceding embodiments, of course, in that the plates W extend vertically.

In Figure 9 the mirror M is oriented about a vertical axis so that the reflected beam clears the wave guide flare P.

In the foregoing description it has been assumed that the requirement is to produce an equiphase surface at the equivalent aperture. This will usually be the case but is not always so: for some purposes it may be required to produce a phase "warp" to satisfy some particular polar diagram requirement. Again, it has been assumed throughout that the energy source is either approximately a point source or an area source giving equiphase energy everywhere in that area. This may not always be the case and the phase distribution across the source must be taken into account when designing a mirror in accordance with this invention. For example, when employing this invention in conjunction with a horn in accordance with the invention contained in the specification of British patent application No. 8,544/46 part of a total required phase correction could be applied by the horn and part by the mirror.

An important advantage of the particular embodiments herein described is that the mirrors proper are flat and the section shapes are not so critical as would be the case with, for example, parabolic mirrors; moreover, by appropriate design, the edge shapes can be made circular. These advantages are of great importance for mirrors for use on centrimetre and millimetre wave lengths. However, the invention is not limited exclusively to its application to flat mirrors though this is probably the most important case of the invention practically.

In some cases, in order to avoid defects due to the bending of ray paths by refraction it may be found advantageous to provide additional metal plates B normal to the direction of the electric field as shown in Fig. 10, and serving to guide the wave elements. The additional metal plates B, which may be termed baffle plates to distinguish them from the velocity modifying partition plates to which they are at right angles, will, if provided, result in a honeycomb-like or cellular structure.

In constructions in accordance with this invention wherein partition plates are provided the beam is, in effect, divided into wave guide sections. These sections need not, however, be each of the same transverse dimensions over its length but if desired the partition plates may be so mounted as to taper the wave guide sections over part or the whole of their lengths. If this expedient be adopted it will be appreciated that the velocity of propagation will be gradually modified within the sections.

In general the plates (baffle and partition plates alike) employed in carrying out this invention, will be for mechanical reasons, solid conductive plates. If desired for reasons of lightness or reduction of windage, however, the plates like the mirror proper, may be perforated or formed of suitable mesh gauze or wire structures and the terms "plate," "mirror," "reflector surface," as herein employed, are intended in a wide sense to include such structures.

In the embodiment specifically described and illustrated the inter-plate spaces are air spaces, i. e. air dielectric is employed in the wave guide sections effectively formed. This, however, is not essential and if desired the inter-plate spaces may be wholly or partly filled with suitable solid dielectrics, due regard being of course, paid in design to the effect of such dielectric on propagation velocity. Such use of solid dielectric offers advantages in many cases from the point of view of mechanical strength and streamlining for reduced windage.

Having now particularly described and ascertained the nature of our said invention and in what manner the same is to be performed, we declare that what we claim is:

1. A radio mirror arrangement comprising a radio reflector having a reflecting surface, and a plurality of spaced parallel metallic-surfaced partition plates arranged in front of said surface and extending across it so as to divide the space in front of said surface in effect into a plurality of wave grid sections, said plates being supported edge-on to said reflecting surface, the distance of separation between each pair of adjacent plates being greater than the separation affording cut-off at the operating frequency, the depth of each plate from edge to edge varying along the length of the plate.

2. The arrangement claimed in claim 1, wherein the said distances of separation of adjacent pairs of plates are all equal.

3. The arrangement claimed in claim 1, the plates being stepped back at points along their length where their depths, at such points, without the step-back, would provide an integral number of wavelengths measured at the phase velocity between plates for energy at the operating frequency plus a predetermined depth equal to the least depth of any plate.

4. The arrangement claimed in claim 1, the radio reflector surface being flat.

5. The arrangement as claimed in claim 1, and comprising also baffle plates spaced from and parallel to each other and at right angles to the said partition plates.

6. A radio wave reflector arrangement comprising a substantially flat reflecting surface, an antenna element arranged in cooperative radio wave translation relationship to said reflecting surface, said antenna element and said reflecting surface normally acting on radio waves to produce a substantially spherical wave front, and wave velocity modifying means arranged between said antenna and said reflecting surface and comprising a plurality of partition members and arranged edgewise to said reflecting surface and parallel to the direction of the electric field, the width of each member varying along the length thereof and the width of said members at corresponding loci varying with respect to each other to differentially modify the velocity of propagation of the radio waves translated over different paths between said antenna element and said reflecting surface to produce a predetermined phase distribution in a given plane tangential to a given direction of said spherical wavefront.

7. A radio wave reflector arrangement comprising a substantially flat reflecting surface, an antenna element arranged in cooperative radio wave translation relationship to said reflecting surface, said antenna element and said reflecting surface normally acting on radio waves to produce a substantially spherical wave front, and wave velocity modifying means arranged between said antenna element and said reflecting surface and comprising a plurality of partition members arranged edgewise to said reflecting surface and parallel to the direction of the electric field, the width of each member varying along the length thereof and the width of said members at corresponding loci varying with respect to each other to differentially modify the velocity of propagation of the radio waves translated over different paths between said antenna element and said reflecting surface to produce a predetermined phase distribution in a given plane normal to the desired direction of said cooperative radio wave translation.

8. A radio wave reflector arrangement comprising a substantially flat reflecting surface, an antenna element arranged to radiate radio waves to said reflecting surface for propagation therefrom by reflection, said antenna element and said reflecting surface normally acting on said radio waves to produce a substantially spherical wave front, and wave velocity modifying means arranged between said antenna element and said reflecting surface and comprising a plurality of partition members arranged edgewise to said reflecting surface and parallel to the direction of the electric field, the width of each member varying along the length thereof and the width of said members at corresponding loci varying with respect to each other to differentially modify the velocity of propagation of said radio waves over different paths between said antenna element and said reflecting surface to produce a predetermined phase distribution in a given plane normal to the desired direction of propagation.

9. A radio wave reflector arrangement comprising a substantially flat reflecting surface, an antenna element arranged to radiate radio waves to said reflecting surface for propagation therefrom by reflection, said antenna element and said reflecting surface normally acting on said radio waves to produce a substantially spherical wave front, and wave velocity modifying means arranged between said antenna element and said reflecting surface and comprising a plurality of partition members arranged edgewise to said reflecting surface and parallel to the direction of the electric field, the width of each member varying along the length thereof and the width of said members at corresponding loci varying with respect to each other to differentially modify the velocity of propagation of said radio waves over different paths between said antenna element and said reflecting surface to produce a predetermined phase distribution in a given plane normal to the desired direction of propagation, said reflecting surface being tilted with respect to the axis of propagation of said antenna element to prevent energy being reflected back thereto.

10. A radio wave reflector arrangement comprising a substantially flat reflecting surface, an antenna element arranged to radiate radio waves to said reflecting surface for propagation therefrom by reflection, said antenna element and said reflecting surface normally acting on said radio waves to produce a substantially spherical wave front, and wave velocity modifying means arranged between said antenna element and said reflecting surface and comprising a plurality of partition members arranged edgewise to said reflecting surface and parallel to the direction of the electric field, the width of each member varying along the length thereof to present path distances between said antenna element and said reflecting surface which in the absence of said variation would be equal to a whole number of wavelengths including unity plus a predetermined length equal to the minimum width of the narrowest of said members, the width of said members at corresponding loci varying with respect to each other to differentially modify the velocity of propagation of said radio waves over different paths between said antenna element and said reflecting surface to produce a predetermined phase distribution in a given plane normal to the desired direction of propagation, and baffle plates arranged normally to said partition members and interposed therebetween, said reflecting surface being tilted with respect to the propagational axis of said antenna element to prevent energy being reflected back thereto.

11. A radio wave reflector arrangement comprising a reflector element having a reflecting surface, an antenna element arranged to illuminate or receive radiation at an operating frequency from said reflecting surface, and wave velocity modifying means comprising spaced metallic plates parallel to each other and to the electric field of the radiation and arranged between said antenna element and said reflecting surface, and also arranged between said reflecting surface and the space to or from which waves are reflected from said element or received by said surface to modify the velocity of propagation of the radio waves translated over different paths between said space and said antenna element both before and after reflection on said surface, said wave-velocity modifying means comprising a plurality of parallel metallic-surfaced plates spaced from and parallel to each other and edge-on to said reflecting surface, the space between any adjacent pair of plates exceeding the separation affording cut-off at the operating frequency, the depth of said plates edge to edge varying along the length thereof, whereby the said waves pass through said modifying means twice, to produce a predetermined phase distribution in a given plane.

NOËL MEYER RUST.
MICHAEL CRAVEN GREGORY.

REFERENCES CITED

The following references are of record in the file of this patent:

UNITED STATES PATENTS

| Number | Name | Date |
|---|---|---|
| 2,423,648 | Hansell | July 8, 1947 |

OTHER REFERENCES

Proc. I. R. E., November 1946, "Metal Lens Antennas," by W. E. Kock.